US010968875B2

(12) United States Patent
Kuriki et al.

(10) Patent No.: US 10,968,875 B2
(45) Date of Patent: Apr. 6, 2021

(54) INTAKE MANIFOLD

(71) Applicant: AISIN SEIKI KABUSHIKI KAISHA, Kariya (JP)

(72) Inventors: Takuma Kuriki, Chiryu (JP); Tomohisa Senda, Kariya (JP); Hideaki Teramoto, Kariya (JP); Ryo Ikegami, Kariya (JP); Kyohei Ninomiya, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 16/523,099

(22) Filed: Jul. 26, 2019

(65) Prior Publication Data
US 2020/0072170 A1 Mar. 5, 2020

(30) Foreign Application Priority Data

Aug. 29, 2018 (JP) .............................. JP2018-160584

(51) Int. Cl.
*F02M 35/10* (2006.01)
*F02M 35/108* (2006.01)
*F02M 35/112* (2006.01)

(52) U.S. Cl.
CPC .... *F02M 35/108* (2013.01); *F02M 35/10026* (2013.01); *F02M 35/112* (2013.01)

(58) Field of Classification Search
CPC .......... F02M 35/112; F02M 35/10222; F02M 35/108; F02M 35/10026
See application file for complete search history.

(56) References Cited

U.S. PATENT DOCUMENTS

| | | | | |
|---|---|---|---|---|
| 6,532,928 | B2* | 3/2003 | Ogata | B29C 65/06 |
| | | | | 123/184.61 |
| 10,731,607 | B2* | 8/2020 | Sakurai | F02M 35/10275 |
| 2006/0037575 | A1* | 2/2006 | Enokida | F02M 35/1036 |
| | | | | 123/184.42 |
| 2006/0249115 | A1* | 11/2006 | Hashimoto | F02M 35/10229 |
| | | | | 123/184.55 |
| 2009/0241886 | A1* | 10/2009 | Kameda | F02M 35/10222 |
| | | | | 123/184.21 |
| 2012/0325186 | A1* | 12/2012 | Enami | F02M 35/10262 |
| | | | | 123/568.17 |
| 2018/0119655 | A1* | 5/2018 | Ito | F02M 35/104 |
| 2018/0372039 | A1* | 12/2018 | Sakurai | F02M 35/10111 |

FOREIGN PATENT DOCUMENTS

JP 2011220299 A 11/2011

* cited by examiner

*Primary Examiner* — Gonzalo Laguarda
(74) *Attorney, Agent, or Firm* — Buchanan, Ingersoll & Rooney PC (57) ABSTRACT

An intake manifold includes a passage wall portion having a first member passage wall portion provided at a first member, a second member passage wall portion provided at a second member, and an inner joint portion including a division point at which an inner joint portion is divided from an outer peripheral joint portion, the inner joint portion at which the first member passage wall portion and the second member passage wall portion are joined with each other. At least a part of the inner joint portion except for the division point is arranged at a height position closer to a middle part of a gas passage than the division point in a first direction in which the first member and the second member are opposed with each other.

9 Claims, 8 Drawing Sheets

INTAKE MANIFOLD

CROSS REFERENCE TO RELATED APPLICATIONS

This application is based on and claims priority under 35 U.S.C. § 119 to Japanese Patent Application 2018-160584, filed on Aug. 29, 2018, the entire content of which is incorporated herein by reference.

TECHNICAL FIELD

This disclosure generally relates to an intake manifold.

BACKGROUND DISCUSSION

A known intake manifold introducing external gas is disclosed in JP2011-220299A (hereinafter referred to as Patent reference 1). The intake manifold disclosed in Patent reference 1 includes a surge tank and plural intake pipes and enhances the distributivity of external gas (Exhaust Gas Recirculation gas or EGR gas, or blow-by gas) to the plural intake pipes by the introduction of the external gas to a center part of the surge tank. The intake manifold includes a gas passage for introducing the external gas to the center part of the surge tank. The gas passage is formed by a passage wall portion extending along an inner surface of the surface tank. Here, the surge tank and the gas passage are formed by two members that are joined with each other by vibration welding. Welded parts of the surge tank and the gas passage are disposed at the same height in a direction in which the surge tank and the gas passage (referred to as a first member and a second member, respectively) are opposed to each other. The welded parts of the surge tank and the gas passage are disposed at positions (positions close to a base part of the passage wall portion) close to a bottom surface of the gas passage of the first member in the direction in which the surge tank and the gas passage are opposed to each other.

However, according to the intake manifold disclosed in Patent reference 1, in a case where the pressure level within the surge tank increases by backfire from an engine (a combustion of an air-fuel mixture outside a combustion chamber), stress is concentrated at the positions close to the base part of the passage wall portion, and large stress is applied to the welded parts of the passage wall portion arranged at the positions close to the base part of the passage wall portion. That is, according to the intake manifold disclosed in Patent reference 1, compressive strength of the passage wall portion for introducing the external gas to the surge tank is low.

A need thus exists for an intake manifold which is not susceptible to the drawback mentioned above.

SUMMARY

According to an aspect of this disclosure an intake manifold includes a surge tank formed by a first member and a second member which are joined with each other, the surge tank to which an external gas is introduced, an outer peripheral joint portion provided so as to surround the surge tank, the outer peripheral joint portion at which the first member and the second member are joined with each other, and a passage wall portion extending inwardly from the outer peripheral joint portion so as to form a gas passage introducing the external gas to the surge tank, the gas passage being formed between inner surfaces of the first member and the second member and the passage wall portion. The passage wall portion includes a first member passage wall portion provided at the first member, a second member passage wall portion provided at the second member, and an inner joint portion including a division point at which the inner joint portion is divided from the outer peripheral joint portion, the inner joint portion at which the first member passage wall portion and the second member passage wall portion are joined with each other. At least a part of the inner joint portion except for the division point is arranged at a height position closer to a middle part of the gas passage than the division point in a first direction in which the first member and the second member are opposed with each other.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of the disclosure will hereunder be explained with reference to the drawings.

An intake manifold 100 mounted on an engine E will be explained according to the embodiment of the disclosure with reference to FIGS. 1 to 9.

Figure 1:
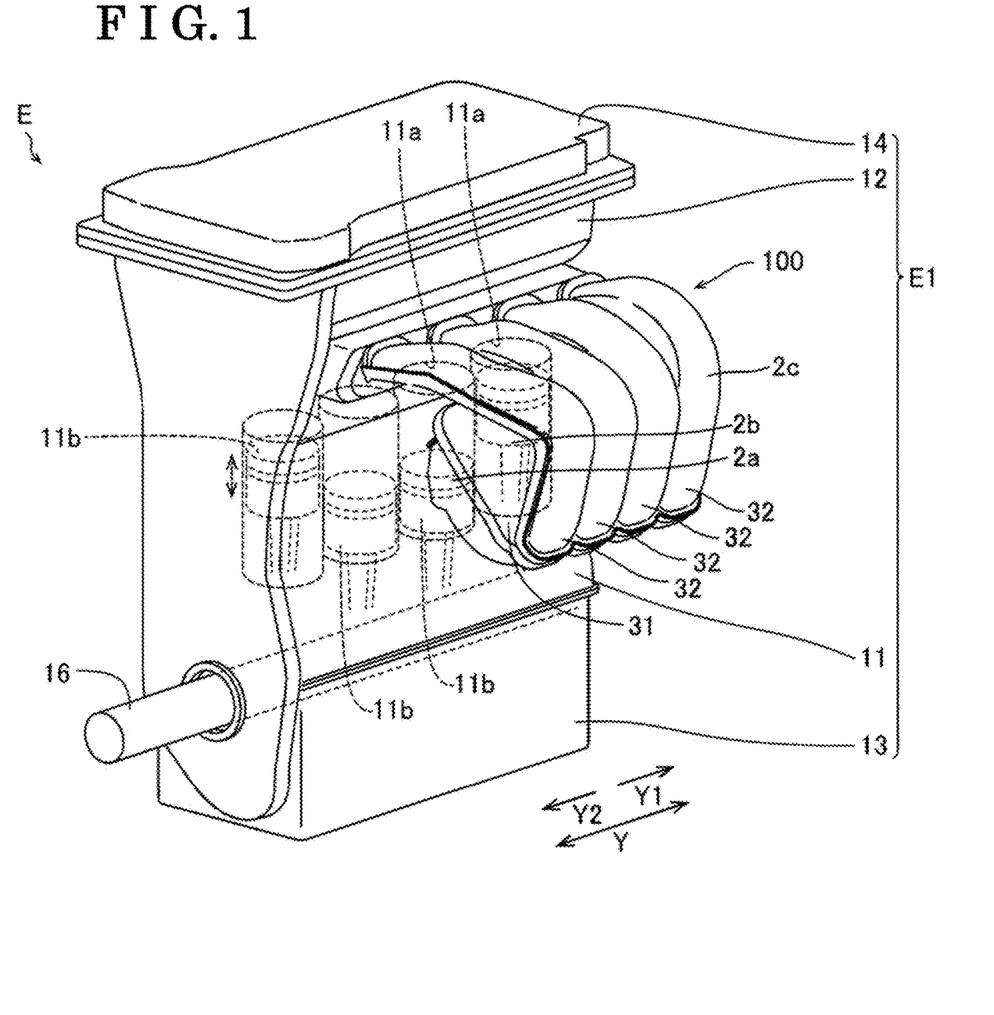
FIG. 1 is a perspective view schematically illustrating an engine including an intake manifold according to an embodiment disclosed here.

A schematic configuration of the engine E will hereunder be explained. The engine E for a vehicle (an automobile) of the embodiment includes an engine body E1 and an intake manifold 100 as shown in FIG. 1.

Figure 2:
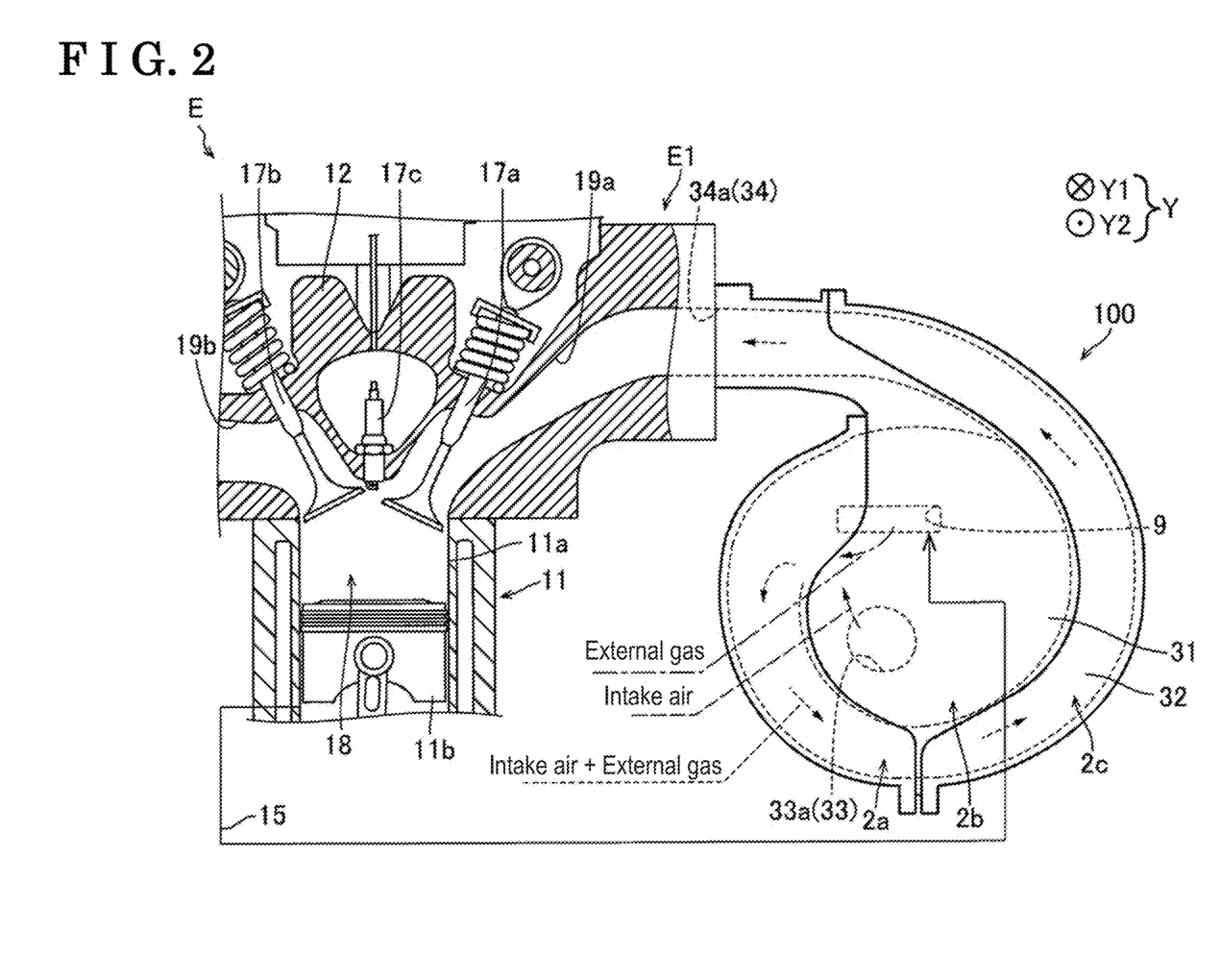
FIG. 2 is a side view schematically illustrating the engine including the intake manifold according to the embodiment.

The engine body E1 includes a cylinder block 11 including cylinders 11a, a cylinder head 12 fixed on an upper surface of the cylinder block 11, a crank case 13 fixed to a bottom surface of the cylinder block 11, a head cover 14 fixed so as to cover an upper portion of the cylinder head 12, and an external gas return passage 15 (see FIG. 2).

The engine E corresponds to an inline multi-cylinder (four-cylinder) engine. The engine E rotates a crank shaft 16 by continuously repeating a cycle of an intake, a compression, an expansion (combustion), and an intake by reciprocating pistons 11b within the plural (for example, four) cylinders 11a extending in an upper-lower direction.

As illustrated in FIG. 2, the cylinder head 12 includes an intake valve 17a and an exhaust valve 17b configured to open and close periodically by the rotation of a camshaft, and an ignition plug 17c. The cylinder head 12 includes a combustion chamber 18, an intake port 19a sending intake air to the combustion chamber 18, and an exhaust port 19b exhausting burned gas. The external gas return path 15 returns the blow-by gas serving as an external gas from the cylinders 11a to the intake manifold 100 to introduce the blow-by gas.

The intake manifold 100 is connected to the intake port 19a from an upstream of a surge tank 31. The intake manifold 100 supplies the gas-fuel mixture of the blow-by gas and the intake air returned via the external gas return passage 15 to the combustion chamber 18 via the intake port 19a.

The detailed configuration of the intake manifold 100 will hereunder be explained. The intake manifold 100 illustrated in FIG. 2 is configured by the plural pieces which are joined with one another by vibration welding. In particular, the intake manifold 100 includes a lower piece 2a (an example of a first member), a middle piece 2b (an example of a second member), and an upper piece 2c, which are joined with one another by vibration welding. In particular, the lower piece 2a and the upper piece 2c are joined only with the middle piece 2b by vibration welding. That is, the upper piece 2c and the lower piece 2a are not joined with each other directly by vibration welding.

The intake manifold 100 (the lower piece 2a, the middle piece 2b and the upper piece 2c) is made from a resin material. For example, the intake manifold 100 is made of nylon 6 reinforced by glass fiber. The lower piece 2a, the middle piece 2b, and the upper piece 2c are manufactured by injection molding using a die.

The intake manifold 100 includes the surge tank 31, plural (for example, four) intake pipes 32, and flanges 33, 34.

The surge tank 31 defines a space part provided inside the intake manifold 100, and divides the intake air (gas-fuel mixture) which is flown in and which is levelled to be substantially equal to one another to distribute the intake air to the plural intake pipes 32. The surge tank 31 includes the lower piece 2a and the middle piece 2b that are joined with each other by vibration welding. The surge tank 31 introduces the blow-by gas serving as external gas from the cylinders 11a in addition to the intake air via the external gas return passage 15. The external gas is introduced to the surge tank 31 via a gas passage 9.

Hereinafter, a direction in which the lower piece 2a and the middle piece 2b are opposed to each other (a bonding direction of the lower piece 2a and the middle piece 2b) corresponds to an X direction (an example of a first direction). A direction of the X direction, the direction facing the middle piece 2b from the lower piece 2a corresponds to an X1 direction, and a direction opposing to the X1 direction corresponds to an X2 direction. A direction in which the plural (for example, four) intake pipes 32 are lined up corresponds to a Y direction.

Figure 3:
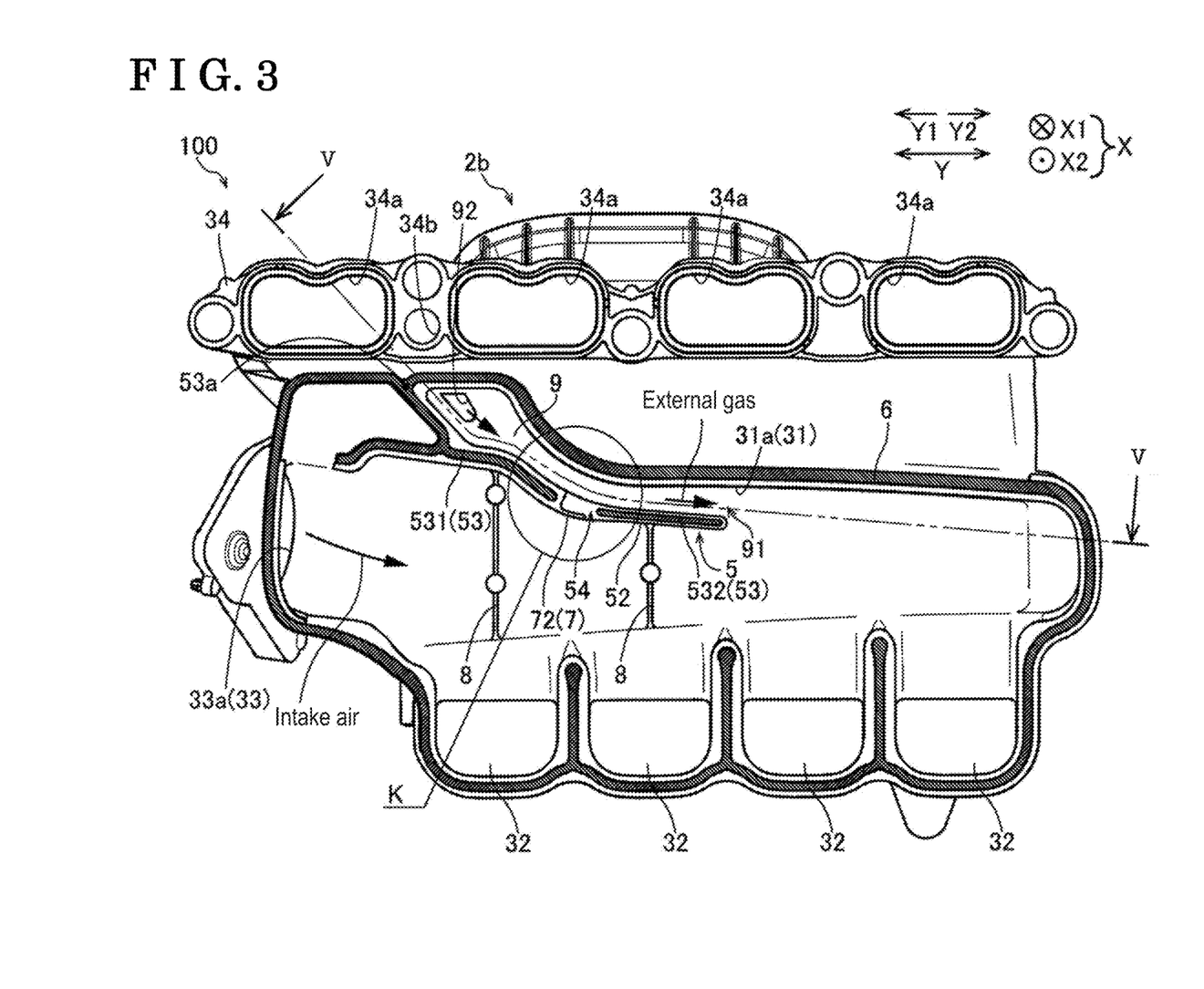
FIG. 3 is a plan view illustrating a middle piece of the intake manifold according to the embodiment.

As illustrated in FIG. 3, the plural (for example, four) intake pipes 32 are arranged so as to be aligned in a line in the Y direction. An upstream part of the intake pipes 32 is provided by the lower piece 2a and the middle piece 2b that are joined with each other by vibration welding. A downstream part of the intake pipes 32 is provided by the middle piece 2b and the upper piece 2c that are joined with each other by vibration welding.

The flange 33 is provided at the upstream of the surge tank 31. The flange 33 includes an inlet 33a introducing the intake air to the surge tank 31. The flange 33 (the inlet 33a) is arranged at an end portion of the surge tank 31 in the Y direction. The flange 34 is arranged at the downstream of the intake pipes 32. The flange 34 includes an outlet 34a discharging the gas-fuel mixture from the intake pipes 32 to the intake port 19a.

The configuration of the intake manifold 100 for introducing the external gas will hereunder be explained.

As shown in FIG. 3, the intake manifold 100 (the lower piece 2a and the middle piece 2b) includes a passage wall portion 5, an outer circumference bonding portion 6, a lid portion 7, and blown-back inhibition portions 8.

The outer peripheral joint portion 6 serves as an annular joint part at which the lower piece 2a and the middle piece 2b are joined with each other by vibration welding. The outer peripheral joint portion 6 is arranged so as to surround the surge tank 31 and the passage wall portion 5. The passage wall portion 5 corresponds to a wall part divided from a wall part surrounding the surge tank 31, and extending inwardly (to a center portion) of the surge tank 31. The passage wall portion 5 extends in the X direction.

The passage wall portion 5 is arranged so as to extend along an inner surface 31a of the surge tank 31 when seen in the X direction. The passage wall portion 5 extends inwardly from the outer peripheral joint portion 6 so as to include the gas passage 9 between the passage wall portion 5 and the inner surface 31a (of the lower piece 2a (see FIG. 2) and the middle piece 2b) of the surge tank 31.

The gas passage 9 corresponds to a passage introducing the external gas to the surge tank 31. The gas passage 9 extends in a direction substantially orthogonal to the X direction. The gas passage 9 extends in a direction inclined relative to the lateral direction such that the downstream of the gas passage 9 (a gas passage outlet 91) is arranged at a lower portion in a state where the intake manifold 100 is mounted on the engine body E1 (see FIG. 2). The gas passage 9 is generally formed in a substantially quadrilateral shape in which the lateral direction corresponds to the X direction at a cross section orthogonal to a flow direction of the external gas (see FIG. 7).

The external gas is introduced from the gas passage inlet 92 arranged at the flange 34 of the middle piece 2b to the intake manifold 100. The external gas coming in the intake manifold 100 is introduced to the gas passage 9 via the gas passage inlet 34 arranged at the upper portion of the surge tank 31. The gas passage inlet 34b is arranged at an end portion of the gas passage 9 provided at the upstream and at the upper portion of the gas passage 9.

The gas passage outlet 91 is provided between inner surfaces of the lower piece 2a and the middle piece 2b (the inner surface 31a of the surge tank 31) and the end portion (an end portion arranged inside (a center part of) the surge tank 31) of the passage wall portion 5 which is opposite to a division point 53a. The gas passage outlet 91 is communicated with an inner space of the surge tank 31 and discharges the external gas to the inner space of the surge tank 31 from the gas passage 9. In other words, the gas passage outlet 91 corresponds to an exit where the external gas is discharged from the gas passage 9 to the surge tank 31. The gas passage 9 generally discharges the external gas towards the end portion of the surge tank 31 in the Y2 direction (an end portion opposite to the flange 33). The gas passage 9 introduces the external gas to inside (the center part) of the surge tank 31 to enhance the distributivity of the external gas to the plural intake pipes 32 comparing to a case of introducing the external gas to the outer side relative to the center part of the surge tank 31.

Figure 4:
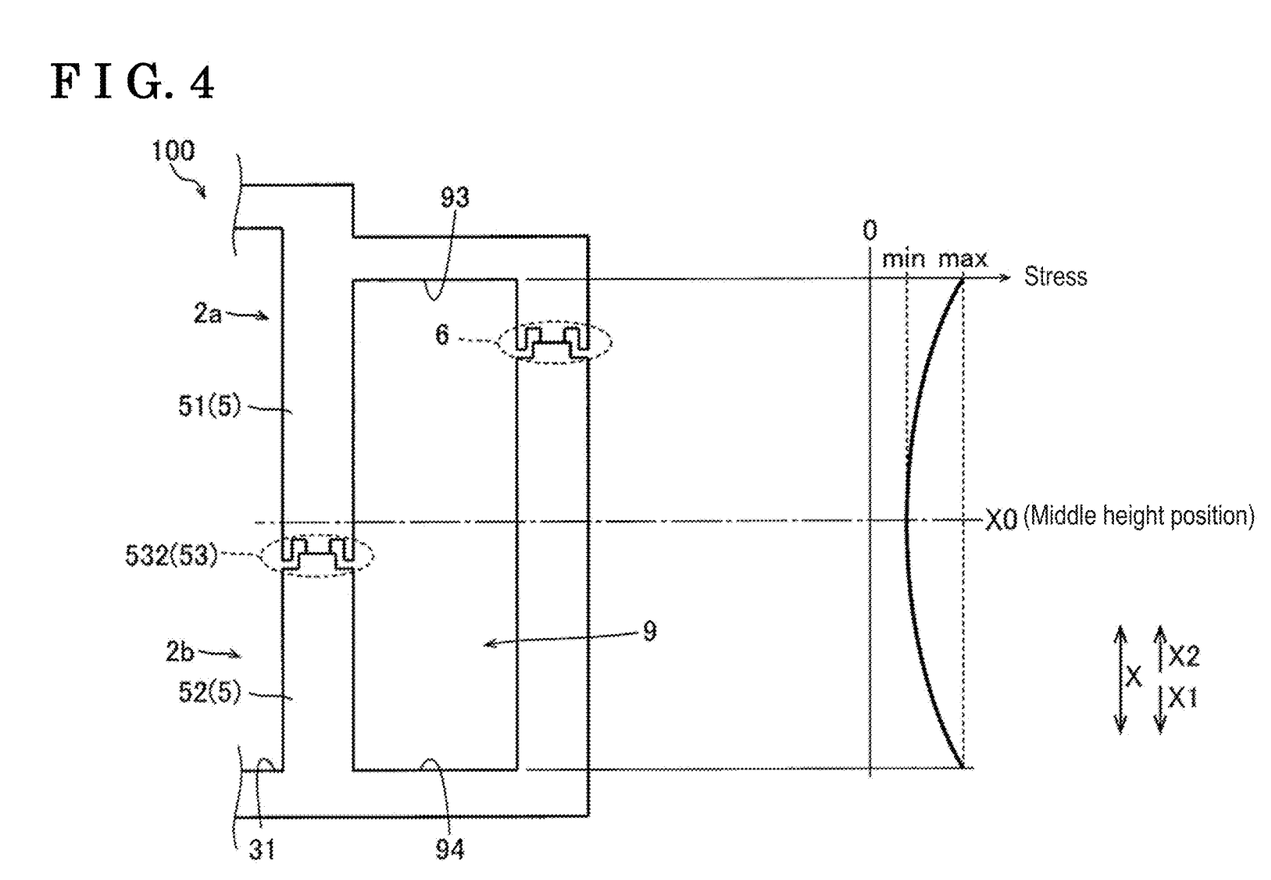
FIG. 4 is a view schematically illustrating a change of a gratitude of a stress applied to a passage wall portion in a longitudinal direction thereof while illustrating a gas passage of the intake manifold from a downstream of external gas in a flow direction.

As schematically illustrated in FIG. 4, the outer peripheral joint portion 6 is arranged at a height closer to a first bottom surface 93 of the gas passage 9 than a middle height position X0 of the gas passage 9 in the X direction. That is, the outer peripheral joint portion 6 is generally arranged at a position close to a base part of the passage wall portion 5 in the X direction (in the X2 direction). The outer peripheral joint portion 6 is arranged closer to the first bottom surface 93 of the lower piece 2a of the gas passage 9 than the second bottom surface 94 of the middle piece 2b of the gas passage 9.

Figure 5:
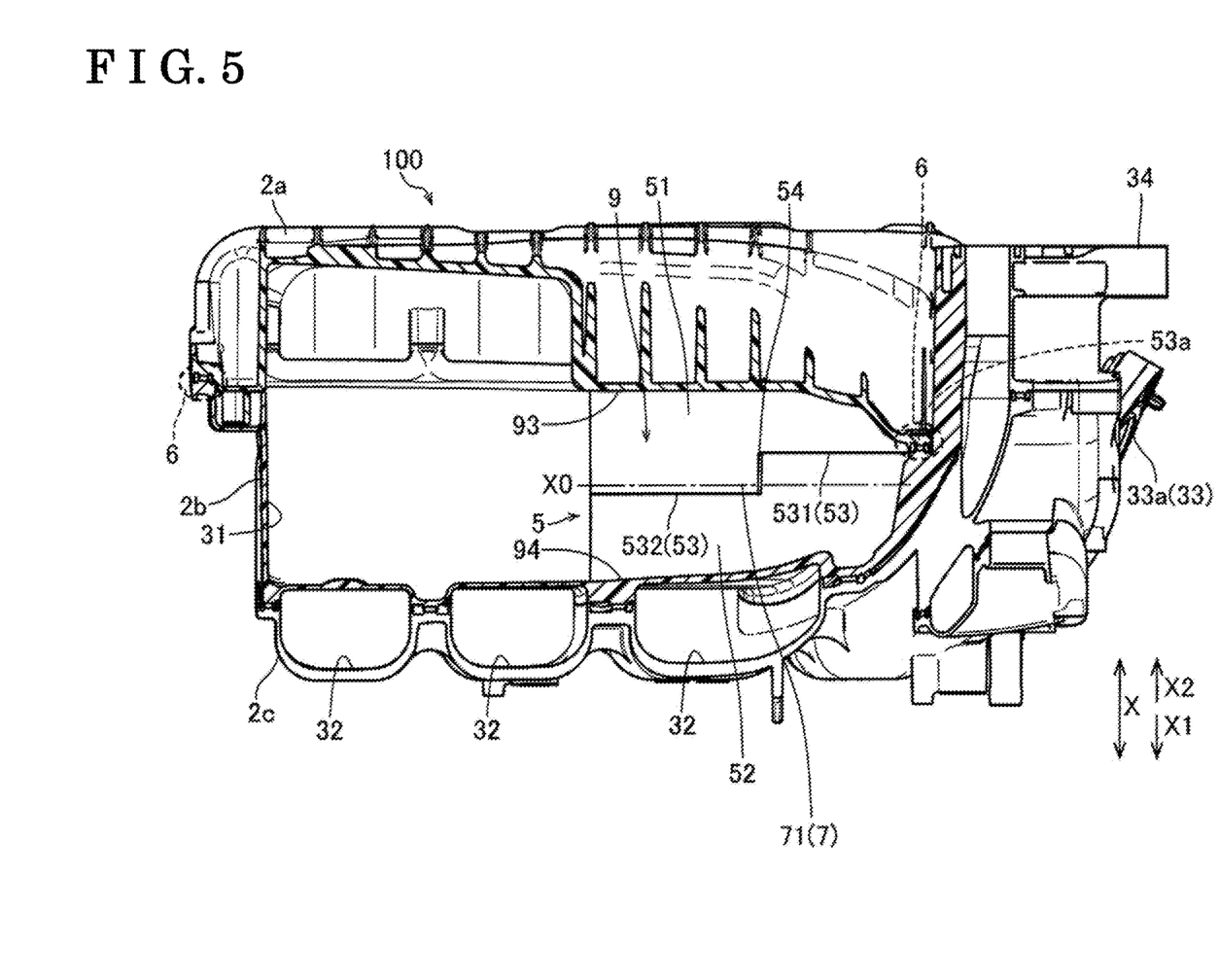
FIG. 5 is a cross sectional view taken along line V-V in FIG. 3.

As illustrated in FIG. 5, the passage wall portion 5 includes a lower passage wall portion 51, a middle passage wall portion 52, and an inner joint portion 53. The lower passage wall portion 51 is an example of a first member passage wall portion. The middle passage wall portion 52 is an example of a second member passage wall portion. The inner joint portion 53 includes the division point 53a. The inner joint portion 53 is arranged between the lower passage wall portion 51 and the middle passage wall portion 52.

Figure 9:
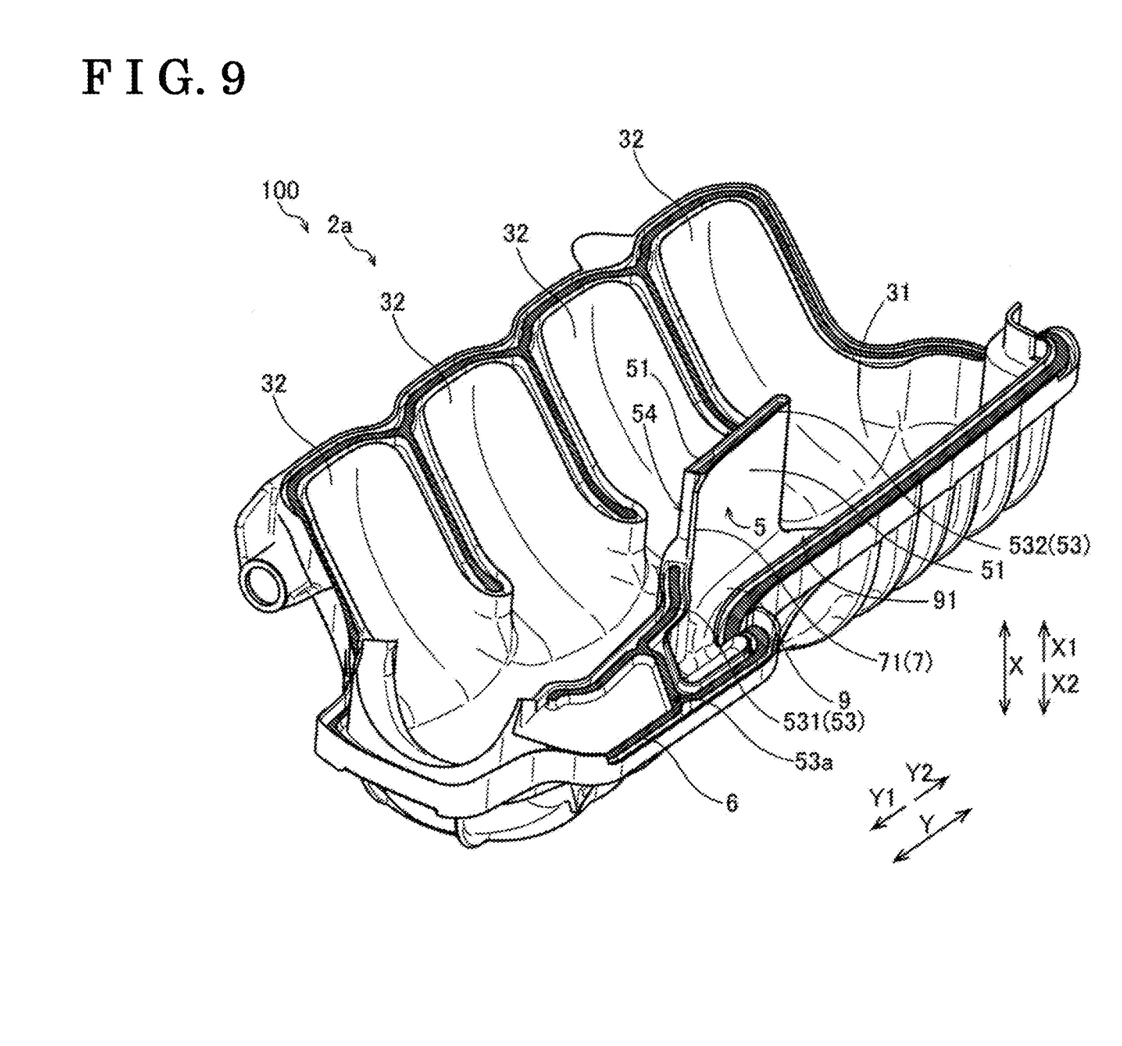
FIG. 9 is a perspective view illustrating a lower piece of the intake manifold according to the embodiment.

The lower passage wall portion 51 is provided with the lower piece 2a (see FIG. 9). The middle passage wall portion 52 is provided at the middle piece 2b (see FIG. 8). The division point 53a is a point of the inner joint portion 53 which is divided from the outer joint portion 6. That is, the division point 53a is a point which is disposed at the upstream end portion of the inner joint portion 53 and where the inner joint portion 53 is connected to the outer peripheral joint portion 6. The inner joint portion 53 is a linear joint part where the lower passage wall portion 51 and the middle passage wall portion 52 are joined with each other by vibration welding. The upstream end portion of the inner joint portion 53 is arranged at the division point 53a, and the downstream end portion of the inner joint portion 53 is arranged at a position inside the surge tank 31 and adjacent to the gas passage outlet 91.

Here, according to the embodiment, at least a part of the inner joint portion 53 other than the division point 53a is disposed at a height closer to a middle part (the middle height position X0) of the gas passage 9 than the division point 53a.

In particular, the inner joint portion 53 includes a first inner joint portion 531 including the division point 53a, and a second inner joint portion 532 arranged at the downstream of the gas passage 9 relative to the first inner joint portion 531. The first inner joint portion 531 and the second inner joint portion 532 are joint parts where the lower piece 2a and the middle piece 2b are joined with each other.

As illustrated in FIG. 3, a clearance 54 is provided between the first inner joint portion 531 and the second inner joint portion 532 of the passage wall portion 5. In other words, the first inner joint portion 531 and the second inner joint portion 532 are joint parts which are separated from each other while not being continuously provided. The first inner joint portion 531 and the second inner joint portion 532 are arranged at heights that are different from each other in the X direction via the clearance 54. The clearance 54 includes a substantially quadrilateral shape when seen from a direction orthogonal to the passage wall portion 5 (when seen from the lateral direction of the passage wall portion 5) (see FIG. 7).

The clearance 54 generally includes a side having a length which corresponds to a difference between the height position of the downstream end portion of the first inner joint portion 531 and the height position of the upstream end portion of the second inner joint portion 532 in the X direction (the height direction). The clearance 54 generally includes another side having a length which corresponds to a length between the downstream end portion of the first inner joint portion 531 and the upstream end portion of the second inner joint portion 532 in a flow direction of the external gas (the lateral direction) within the gas passage 9.

The first inner joint portion 531 and the outer peripheral joint portion 6 where the division point 53a is arranged are disposed so as to extend in the lateral direction (an example of a second direction) orthogonal to the X direction at the same height in the X direction. That is, the first inner joint portion 531 and the outer peripheral joint portion 6 where the division point 53a is arranged are joint parts in which the lower piece 2a and the middle piece 2b are continuously in contact with each other at the time of vibration welding.

The first inner joint portion 531 and the second inner joint portion 532 are arranged so as to extend in the lateral direction which is orthogonal to the X direction. As illustrated in FIG. 5, the second inner joint portion 532 is arranged so as to extend in the lateral direction orthogonal to the X direction at a height closer to the middle part (the middle height X0) of the gas passage 9 than the first inner joint portion 531. When seen from the X direction, the first inner joint portion 531 includes the length that is longer than the second inner joint portion 532. When seen from the X direction, the second inner joint portion 532 includes the length longer than the distance between the first inner joint portion 531 and the second inner joint portion 532 (the size of the clearance 54).

Here, as shown in FIG. 4, in a case where the pressure level within the surge tank 31 increases by blown-back of gas caused by backfire (the combustion of the gas-fuel mixture outside the combustion chamber 18 (see FIG. 2)) from the engine E (see FIG. 2) to the surge tank 31, the stress distribution applied to the passage wall portion 5 in the X direction comes to be the maximum at the both end portions (the first and second bottom surfaces 93, 94) serving as the base parts of the passage wall portions 5 in the X direction, and comes to be the minimum at the middle height position X0 of the both end portions serving as the base parts of the passage wall portions 5 in the X direction.

That is, the stress is concentrated while not being able to be discharged because the passage wall portion 5 is not displaced in the direction orthogonal to the X direction (the lateral direction) at the both end portions serving as the base parts of the passage wall portion 5. On the other hand, at the middle height position X0 of the both end portions serving as the base parts of the passage wall portion 5 in the X direction, the passage wall portion 5 may be displaced in the direction orthogonal to the X direction (the lateral direction), and the stress may be relieved by being discharged. The second inner joint portion 532 is arranged closer to the middle height position X0 than the outer peripheral joint portion 6 rather than at a position close to the base part of the passage wall portion 5 (the first and second bottom surfaces 93, 94) in the X direction so as to effectively relieve the stress caused by the backfire.

The inner joint portion 53 is easily influenced with the blown-back of gas from the engine E by being arranged at an inner side of the surge tank 31 relative to the outer peripheral joint portion 6. The inner joint portion 53 is easily influenced with the blown-back of gas from the engine E because the end portion of the downstream is open, which is different from the annular outer peripheral joint portion 6. The inner joint portion 53 eases the stress by the clearance 54 (see FIG. 3) arranged at the middle part of the inner joint portion 53 so that the stress is not easily transmitted to the outer peripheral joint portion 6.

Figure 6:
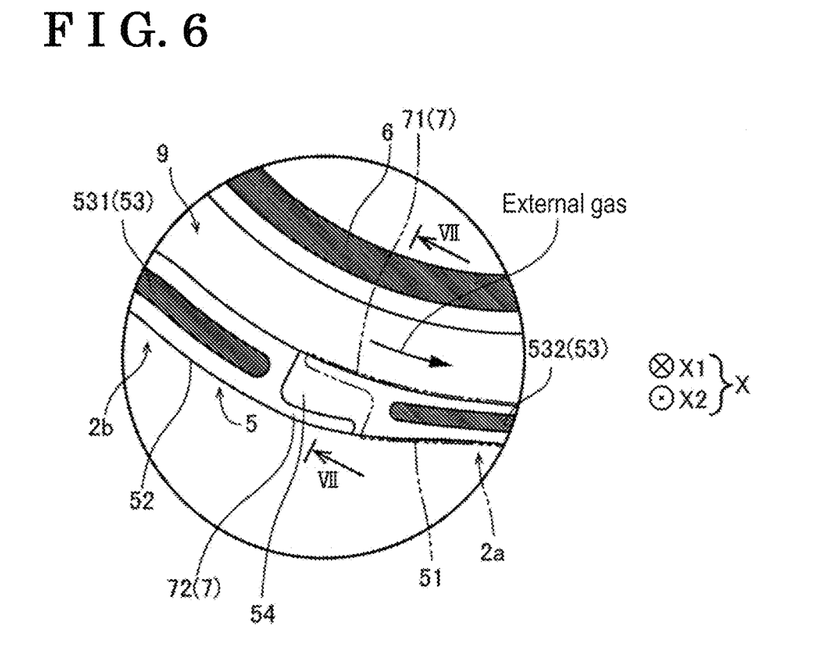
FIG. 6 is an enlarged view of a K portion in FIG. 3.
Figure 7:
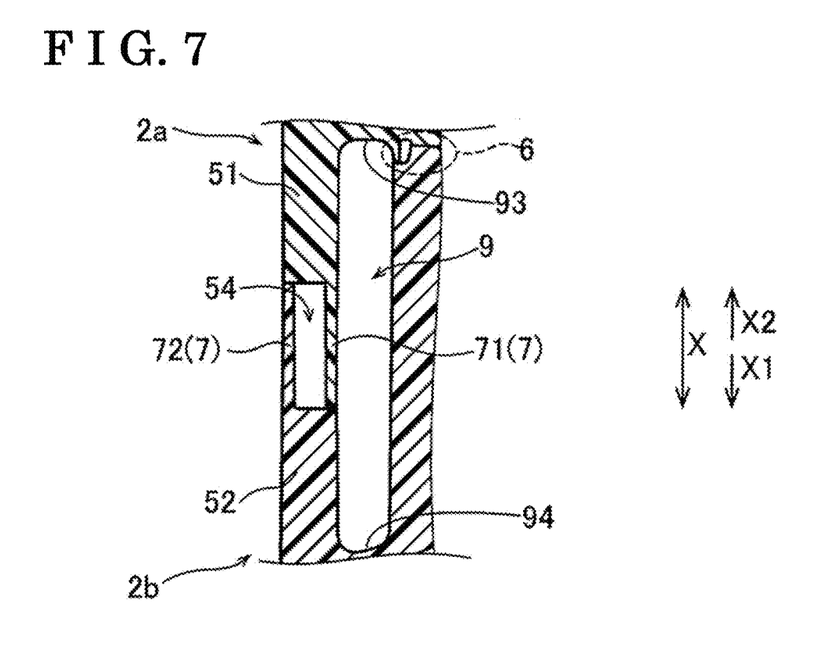
FIG. 7 is a cross sectional view taken along line VII-VII in FIG. 6.
Figure 8:
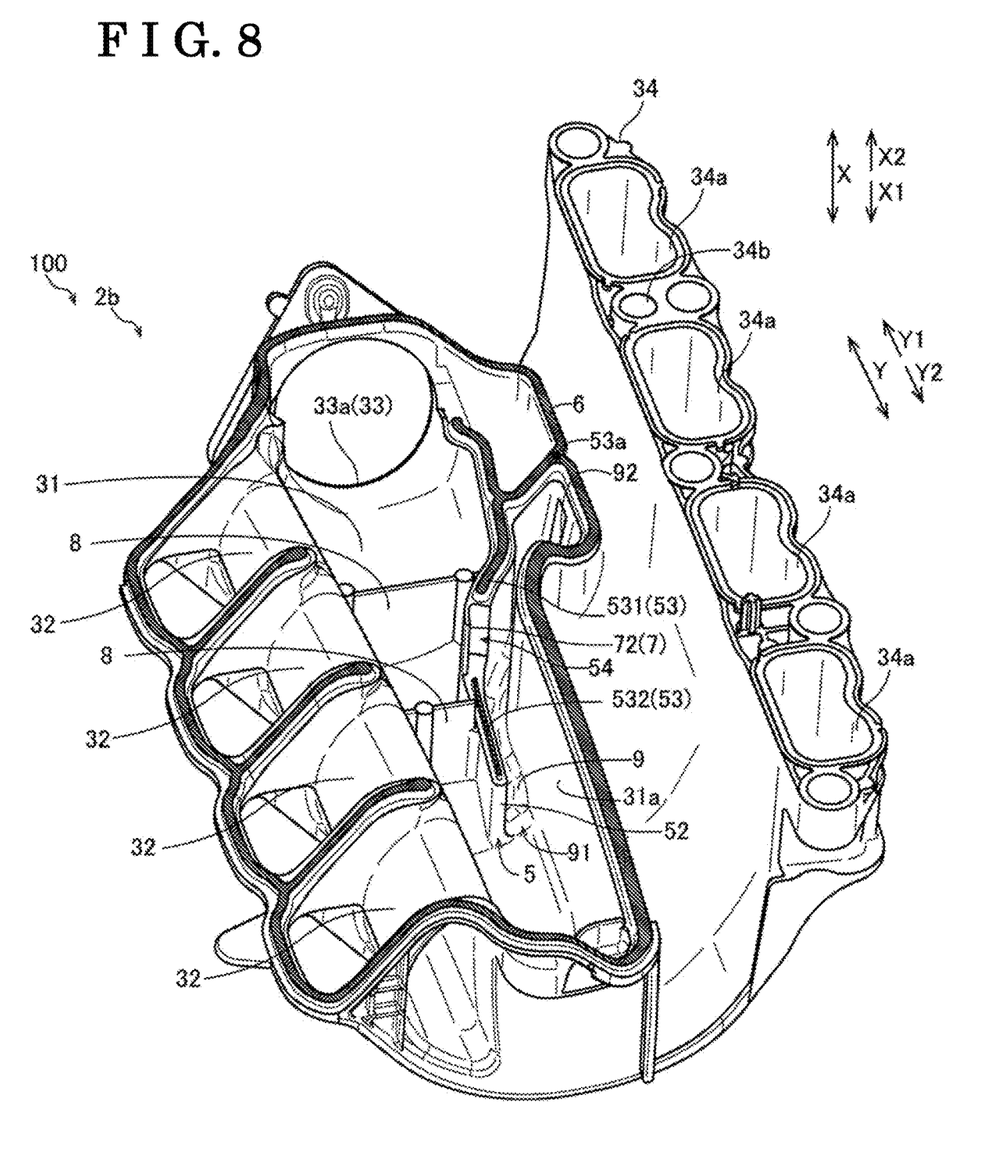
FIG. 8 is a perspective view illustrating the middle piece of the intake manifold according to the embodiment.

As illustrated in FIGS. 6 and 7, the lid portion 7 is arranged at the clearance 54 and includes a function reducing the size of the clearance 54. Accordingly, the lid portion 7 inhibits the external gas from flowing in (leaking to) the inner space of the surge tank 31 from the clearance 54. In particular, the lid portion 7 includes a first lid portion 71 and a second lid portion 72. The first lid portion 71 is arranged at the lower passage wall portion 51 (the lower piece 2a). The second lid portion 72 is arranged at the middle passage wall portion 52 (the middle piece 2b) so as to be opposed to the first lid portion 71.

As illustrated in FIG. 6, the first lid portion 71 extends along the inner surface of the passage wall portion 5 (the inner surface of the gas passage 9). The first lid portion 71 extends from the downstream (a lower side) toward the upstream (an upper side) of the gas passage 9. The first lid portion 71 is thinner than the passage wall portion 5. The first lid portion 71 is formed in a quadrilateral shape slightly smaller than the clearance 54.

As illustrated in FIG. 6, the second lid portion 72 extends along the outer surface of the passage wall portion 5 (the surface opposite to the gas passage 9). The second lid portion 72 is arranged substantially in parallel to the first lid portion 71. The second lid portion 72 extends from the upstream (an upper side) toward the downstream (a lower side) of the gas passage 9. The second lid portion 72 is thinner than the passage wall portion 5. The second lid portion 72 is formed in a quadrilateral shape slightly smaller than the clearance 54.

As shown in FIG. 6, a small clearance is provided between the upstream end portion of the first lid portion 71 and the middle passage wall portion 52 when seen from the X direction. A small clearance is provided between the downstream end portion of the second lid portion 72 and the lower passage wall portion 51. The intake manifold 100 (see FIG. 3) may discharge water from the gas passage 9 to the surge tank 31 via the clearances and the clearance 54 along the inclination of the gas passage 9 in a case where water is accumulated in the gas passage 9.

As shown in FIG. 3, the blown-back inhibition portions 8 are arranged at the middle piece 2b. The blown-back inhibition portions 8 extend between the surge tank 31 and the passage wall portion 5, and is formed in a rib shape extending in a direction orthogonal to the passage wall portion 5 (a direction orthogonal to the Y direction). The plural (for example, two) blown-back inhibition portions 8 are provided so as to be separated from each other in the Y direction. The blown-back inhibition portions 8 inhibit the blown back of the external gas to the upstream of the surge tank 31 (to a throttle valve) by being exposed to the external gas discharged from the gas passage 9 and introduced to the inner space of the surge tank 31. Accordingly, the blown-back inhibition portions 8 may inhibit water from being applied to the throttle valve caused by the blown back of the external gas. In a case where water is applied to the throttle valve, the throttle valve has a trouble of moving by being frozen at a cold climate area.

The blown-back inhibition portions 8 are arranged across the surge tank 31 and the passage wall portion 5. Accordingly, in a case where the blown back of gas is caused by the backfire (the combustion of the gas-fuel mixture outside the combustion chamber) from the engine E to the surge tank 31, the passage wall portion 5 is inhibited from being deformed. That is, the blown-back inhibition portions 8 also include a function as a reinforcement member of the passage wall portion 5.

According to the embodiment, following effects and advantages may be attained.

In the embodiment, the passage wall portion 5 includes the lower passage wall portion 51, the middle passage wall portion 52, and the division point 53a. The lower passage wall portion 51 is provided at the lower piece 2a. The middle passage wall portion 52 is provided at the middle piece 2b. The division point 53a is divided from the outer peripheral joint portion 6. The passage wall portion 5 further includes the inner joint portion 53 where the lower passage wall portion 51 and the middle passage wall portion 52 are joined with each other. At least a part of the inner joint portion 53 other than the division point 53a is arranged at the height position closer to the middle part of the gas passage 9 than the division point 53a in the X direction in which the lower piece 2a and the middle piece 2b are opposed with each other. Accordingly, the inner joint portion 53 serving as a joint portion of the lower passage wall portion 51 and the middle passage wall portion 52 which form the gas passage 9 may be arranged at the height position closer to the middle part of the gas passage 9 than the division point 53a so that at least a part of the inner joint portion 53 may be arranged at a position away from the base parts of the passage wall portion 5 (the lower passage wall portion 51 and the middle passage wall portion 52) relative to the division point 53a. That is, at least a part of the inner joint portion 53 may be arranged away from a position where the stress tends to be concentrated by the increase of the pressure level of the surge tank 31 due to the backfire. As a result, the compressive strength of the passage wall portion 5 for introducing the external gas to the surge tank 31 may be enhanced.

According to the aforementioned embodiment, the inner joint portion 53 includes the first inner joint portion 531 and the second inner joint portion 532. The first inner joint portion 53 includes the division point 53a. The second inner joint portion 532 is arranged at the downstream of the gas passage 9 relative to the first inner joint portion 531. The clearance 54 is arranged between the first inner joint portion 531 and the second inner joint portion 532 of the passage wall portion 5. Accordingly, the clearance 54 may easily differ the height positions of the first inner joint portion 531 and the second inner joint portion 532 in the X direction. Because the first inner joint portion 531 including the division point 53a is provided, the clearance 54 may be provided at a position away from the outer peripheral joint portion 6 by the length of the first inner joint portion 531. Accordingly, the first inner joint portion 531 and the outer peripheral joint portion 6 are continuously provided to be arranged at the same height position at the division point 52. As a result, the stress may be inhibited from being concentrated at the outer peripheral joint portion 6.

According to the embodiment, the first inner joint portion 531 and the outer peripheral joint portion 6 are arranged so as to extend in the direction orthogonal to the X direction (the lateral direction) at the same height position in the X direction. Accordingly, in a case where the lower piece 2a and the middle piece 2b are joined with each other by vibration welding, the first inner joint portion 531 and the outer peripheral joint portion 6 are arranged in the direction (the lateral direction) orthogonal to the X direction in which the lower piece 2a and the middle piece 2b are opposed to each other. Accordingly, comparing to a case where the first inner joint portion 531 and the outer peripheral joint portion 6 are inclined relative to the direction orthogonal to the X direction (the lateral direction), the first inner joint portion 531 and the outer peripheral joint portion 6 may be more securely joined with each other.

According to the embodiment, as mentioned above, the first inner joint portion 531 and the second inner joint portion 532 are arranged so as to extend in the direction orthogonal to the X direction. The second inner joint portion 532 is arranged so as to extend in the direction orthogonal to the X direction at the height position closer to the middle part of the gas passage 9 than the first inner joint portion 531 in the X direction via the clearance 54. Accordingly, a part of the downstream end portion of the inner joint portion 53 (the second inner joint portion 532) may be arranged at the height position closer to the middle part of the gas passage 9 than the first inner joint portion 531. Thus, the center part of the passage wall portion 5 which tends to be affected by the backfire may be reinforced. Comparing to a case where the second inner joint portion 532 is arranged at the base part of the passage wall portion 5 closer than the first inner joint portion 531, the protruding height of the die at a part corresponding to the gas passage 9 may be reduced, the die employed for molding the lower piece 2*a* and the middle piece 2*b*. Accordingly, the die (a resin-molding die) for molding the lower piece 2*a* and the middle piece 2*b* may be reinforced.

In the embodiment, as mentioned above, the lower piece 2*a* and the middle piece 2*b* are joined with each other by vibration welding. Accordingly, in a case where the lower piece 2*a* and the middle piece 2*b* are made from resin material, the lower piece 2*a* and the middle piece 2*b* may be easily and firmly joined with each other.

In the embodiment, as mentioned above, the outer peripheral joint portion 6 is arranged at a height position closer to the first bottom surface 93 of the gas passage 9 than the middle height position X0 of the gas passage 9 in the X direction. Accordingly, at least a part of the inner joint portion 53 other than the division point 53*a* may be arranged at a height position closer to the middle part of the gas passage 9 than the outer peripheral joint portion 6 which is arranged at a height position closer to the first bottom surface 93 of the gas passage 9 in the X direction.

In the embodiment, as mentioned above, the lid portion 7 decreasing the size of the clearance 54 is arranged thereat. Accordingly, the clearance 54 may easily differ the height position of the first inner joint portion 531 and the second inner joint portion 532 in the X direction. At the same time, the lid portion 7 inhibits the external gas from flowing into (leaking to) the surge tank 31 from the gas passage 9 via the clearance 54.

In the embodiment, as mentioned above, the blown-back inhibition portions 8 are arranged across the surge tank 31 and the passage wall portion 5, and each is formed in the rib shape extending in the direction orthogonal to the passage wall portion 5. The blown-back inhibition portions 8 inhibit the external gas from blowing back to the upstream of the surge tank 31 by being exposed to the external gas discharged to the inner space of the surge tank 31 from the gas passage 9. Accordingly, the blown-back inhibition portions 8 arranged across the passage wall portion 5 may reinforce the passage wall portion 5 while inhibiting the external gas from blowing back to the upstream of the surge tank 31. That is, the compressive strength of the passage wall portion 5 for introducing the external gas to the surge tank 31 may be further enhanced.

A modified example of the embodiment will hereunder be explained.

For example, in the aforementioned embodiment, the external gas introduced to the intake manifold 100 is blow-by gas. Alternatively, Exhaust Gas Recirculation gas or EGR gas may be employed as the external gas introduced to the intake manifold 100.

In the aforementioned embodiment, the clearance 54 is provided between the first inner joint portion 531 and the second inner joint portion 532 of the passage wall portion 5. Alternatively, a step may be provided between the first inner joint portion 531 and the second inner joint portion 532 of the passage wall portion 5 without having the clearance 54 between the first inner joint portion 531 and the second inner joint portion 532 (the step which is inclined to gradually change the height position of the first inner joint portion 531 and the second inner joint portion 532 in the X direction).

In the aforementioned embodiment, the lid portion 7 is configured by two parts which are the first lid portion 71 and the second lid portion 72. Alternatively, one or equal to or more than three of the lid portion 7 may be provided.

In the aforementioned embodiment, the intake manifold 100 may be configured by three pieces which are the lower piece 2*a*, the middle piece 2*b*, and the upper piece 2*c*. Alternatively, the intake manifold 100 may be configured by two pieces or equal to or more than four pieces.

In the aforementioned embodiment, the intake manifold 100 is provided with the blown-back inhibition portion 8. Alternatively, the intake manifold 100 does not have to be provided with the blown-back inhibition portion 8.

In the aforementioned embodiment, the inner joint portion 53 includes the two joint portions (the first inner joint portion 531 and the second inner joint portion 532). Alternatively, the equal to or more than three inner joint portions 53 may be provided.

In the aforementioned embodiment, the lower piece 2*a*, the middle piece 2*b*, and the upper piece 2*c* are joined with one another by vibration welding. Alternatively, the lower piece 2*a*, the middle piece 2*b*, and the upper piece 2*c* may be joined with one another by a method other than vibration welding, for example, ultrasonic welding.

In the disclosure, the second inner joint portion 532 may be arranged at any height position as long as being arranged at the height position closer to the middle part of the gas passage 9 than the division point 53*a* in the X direction.

According to the aforementioned embodiment, the intake manifold (100) includes the surge tank (31) formed by the first member (the lower piece 2*a*) and the second member (the middle piece 2*b*) which are joined with each other, the surge tank (31) to which the external gas is introduced, the outer peripheral joint portion (6) provided so as to surround the surge tank (31), the outer peripheral joint portion (6) at which the first member (the lower piece 2*a*) and the second member (the middle piece 2*b*) are joined with each other, and the passage wall portion (5) extending inwardly from the outer peripheral joint portion (6) so as to form the gas passage (9) introducing the external gas to the surge tank (31), the gas passage (9) being formed between inner surfaces of the first member (the lower piece 2*a*) and the second member (the middle piece 2*b*) and the passage wall portion (5). The passage wall portion (5) includes the first member passage wall portion (the lower passage wall portion 51) provided at the first member (the lower piece 2*a*), the second member passage wall portion (the middle passage wall portion 52) provided at the second member (the middle piece 2*b*), and the inner joint portion (53) including a division point (53*a*) at which the inner joint portion (53) is divided from the outer peripheral joint portion (6), the inner joint portion (53) at which the first member passage wall portion (the lower passage wall portion 51) and the second member passage wall portion (the middle passage wall portion 52) are joined with each other. At least a part of the inner joint portion (53) except for the division point (53a) is arranged at the height position closer to the middle part of the gas passage (9) than the division point (53a) in the first direction (the X direction) in which the first member (the lower piece 2a) and the second member (the middle piece 2b) are opposed with each other.

According to an aspect of this disclosure, the intake manifold 100 includes the passage wall portion 5 provided with the first member passage wall portion (the lower passage wall portion 51) provided at the first member (the lower piece 2a), the second member passage wall portion (the upper passage wall portion 52) provided at the second member (the middle piece 2b), an inner joint portion 53 including a division point 53a at which the passage wall portion 5 is divided from the outer peripheral joint portion 6, the inner joint portion 53 at which the first member passage wall portion (the lower passage wall portion 51) and the second member passage wall portion (the upper passage wall portion 52) are joined with each other. At least a part of the inner joint portion 53 other than the division point 53a is arranged at a height position closer to the middle part of the gas passage 9 than the division point 53a in the first direction (the X direction) in which the first member (the lower piece 2a) and the second member (the middle piece 2b) are opposed with each other. Accordingly, because the inner joint portion 53 serving as a joint portion of the first member passage wall portion (the lower passage wall portion 51) and the second member passage wall portion (the upper passage wall portion 52) forming the gas passage 9 may be arranged at the height position closer to the middle part of the gas passage 9 than the division point 53a, at least one of the inner joint portion 53 may be arranged at a position away from the base part of the passage wall portion 5 (the first member passage wall portion (the lower passage wall portion 51) and the second member passage wall portion (the upper passage wall portion 52)) relative to the division point 53a. That is, at least a part of the inner joint portion 53 may be arranged away from a position where the stress tends to be concentrated by the increase of the pressure level of the surge tank 31 due to the backfire. As a result, the compressive strength of the passage wall portion 5 for introducing the external gas to the surge tank 31 may be enhanced.

According to the aforementioned embodiment, the inner joint portion (53) includes the first inner joint portion (531) including the division point (53a) and the second inner joint portion (532) arranged at the downstream of the gas passage (9) relative to the first inner joint portion (531). The passage wall portion (5) includes the clearance (54) between the first inner joint portion (531) and the second inner joint portion (532).

According to the aforementioned configuration, the clearance 54 may easily differ the height positions of the first inner joint portion 531 and the second inner joint portion 532 in the X direction (the first direction). Because the first inner joint portion 531 including the division point 53a is provided, the clearance 54 may be provided at a position away from the outer peripheral joint portion 6 by the length of the first inner joint portion 531. Accordingly, the stress may be inhibited from being concentrated at the outer peripheral joint portion 6.

According to the aforementioned embodiment, the first inner joint portion (531) and the outer peripheral joint portion (6) are arranged at the same height position in the first direction (the X direction) and extend in the second direction which is orthogonal to the first direction (the X direction).

According to the aforementioned configuration, in a case where the lower piece 2a and the middle piece 2b are joined with each other by vibration welding, the first inner joint portion 531 and the outer peripheral joint portion 6 are arranged in the direction (the lateral direction) orthogonal to the X direction in which the lower piece 2a and the middle piece 2b are opposed to each other. Accordingly, comparing to a case where the first inner joint portion 531 and the outer peripheral joint portion 6 are inclined relative to the direction orthogonal to the X direction (the lateral direction), the first inner joint portion 531 and the outer peripheral joint portion 6 may be further securely joined with each other.

According to the aforementioned embodiment, the first inner joint portion (531) and the second inner joint portion (532) are arranged so as to extend in the second direction which is orthogonal to the first direction (X). The second inner joint portion (532) is arranged so as to extend in the second direction at the height position closer to the middle part of the gas passage (9) than the first inner joint portion (531) in the first direction (X) via the clearance (54).

According to the aforementioned configuration, the downstream end portion of the inner joint portion 53 (the second inner joint portion 532) may be arranged at the height position closer to the middle part of the gas passage 9 than the first inner joint portion 531. Thus, the center part of the passage wall portion 5 which tends to be affected by the backfire may be reinforced. Comparing to a case where the second inner joint portion 532 is arranged at the base part of the passage wall portion 5 closer than the first inner joint portion 531, the protruding height of the die at a part corresponding to the gas passage 9 may be reduced, the die employed for molding the lower piece 2a and the middle piece 2b. Accordingly, the die for molding the lower piece 2a and the middle piece 2b may be reinforced.

According to the aforementioned embodiment, the first member (the lower piece 2a) and the second member (the middle piece 2b) are joined with each other by vibration welding or by ultrasonic welding.

According to the aforementioned configuration, in a case where the lower piece 2a and the middle piece 2b are made from resin material, the lower piece 2a and the middle piece 2b may be easily and firmly joined with each other.

According to the aforementioned embodiment, the outer peripheral joint portion (6) is arranged at the height position closer to the bottom surface (93) of the gas passage (9) than the height position of the middle part of the gas passage (9).

According to the aforementioned configuration, at least a part of the inner joint portion 53 other than the division point 53a may be arranged at a height position closer to the middle part of the gas passage 9 than the outer peripheral joint portion 6 which is arranged at a height position closer to the first bottom surface 93 of the gas passage 9 in the first direction (the X direction).

According to the aforementioned embodiment, the intake manifold (100) further includes the lid portion (7, 71, 72) arranged at the clearance (54), the lid portion decreasing the dimension of the clearance (54).

According to the aforementioned configuration, the clearance 54 may easily differ the height position of the first inner joint portion 531 and the second inner joint portion 532 in the X direction. At the same time, the lid portion 7 inhibits the external gas from flowing into (leaking to) the surge tank 31 from the gas passage 9 via the clearance 54.

According to another aspect of this disclosure, the intake manifold 100 includes the first lid portion 71 and the second lid portion 72. The first lid portion 71 is arranged at the first member passage wall portion (the lower passage wall portion 51). The second lid portion 72 is arranged at the second member passage wall portion (the upper passage wall portion 52) so as to be opposed to the first lid portion 71.

According to the aforementioned configuration, the plural lid portions (7, 71, 72) inhibit the external gas from flowing into (leaking to) the surge tank 31 from the gas passage 9 via the clearance 54.

According to the aforementioned embodiment, the intake manifold (100) further includes the blown-back inhibition portion (8) provided from the surge tank (31) to the passage wall portion (5), the blown-back inhibition portion (8) being formed in the rib shape extending in the direction which is orthogonal to the passage wall portion (5), the blown-back inhibition portion (8) inhibiting the external gas from blowing back to the upstream of the surge tank (31) by being exposed to the external gas introduced to an inner space of the surge tank (31) via the gas passage (9).

According to the aforementioned configuration, the blown-back inhibition portion 8 arranged across the passage wall portion 5 may reinforce the passage wall portion 5 while inhibiting the external gas from blowing back to the upstream of the surge tank 31. That is, the compressive strength of the passage wall portion 5 for introducing the external gas to the surge tank 31 may be further enhanced.

According to another aspect of this disclosure, an intake manifold may also be configured as follows.

According to an aspect of this disclosure, the intake manifold 100 further includes a gas passage outlet which is arranged between the inner surfaces of the first member (the lower piece 2a) and the second member and the end portion of the passage wall portion 5 which is opposite to the division point 53a of the passage wall portion 5, the gas passage outlet being communicated with the inner space of the surge tank 31, and discharging the external gas to the inner space of the surge tank 31 from the gas passage 9.

According to the aforementioned configuration, because the gas passage outlet is arranged at the end portion of the passage wall portion 5 which is opposed to the division point 53a of the passage wall portion 5, the external gas may be discharged to the inner space of the surge tank 31 close to the center of the surge tank 31. As a result, the distributivity of the external gas to the plural intake pipes may be enhanced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An intake manifold, comprising:
a surge tank formed by a first member and a second member which are joined with each other, the surge tank to which an external gas is introduced;
an outer peripheral joint portion at which the first member and the second member are joined with each other; and
a passage wall portion extending inwardly from the outer peripheral joint portion so as to form a gas passage introducing the external gas to the surge tank, the gas passage being formed between inner surfaces of the first member and the second member and the passage wall portion; wherein
the passage wall portion includes
a first member passage wall portion provided at the first member;
a second member passage wall portion provided at the second member; and
an inner joint portion including a division point at which the inner joint portion is divided from the outer peripheral joint portion, the inner joint portion at which the first member passage wall portion and the second member passage wall portion are joined with each other;
the inner joint portion includes a first inner joint portion including the division point and a second inner joint portion;
the second inner joint portion is arranged at a height position closer to a middle part of the gas passage than the division point in a first direction in which the first member and the second member are opposed with each other;
the first inner joint portion and the second inner joint portion are arranged so as to extend in a second direction which is orthogonal to the first direction;
the second inner joint portion is arranged so as to extend in the second direction at the height position closer to the middle part of the gas passage than the first inner joint portion in the first direction.

2. The intake manifold according to claim 1, wherein
the second inner joint portion is arranged at a downstream of the gas passage relative to the first inner joint portion; and
the passage wall portion includes a clearance between the first inner joint portion and the second inner joint portion.

3. The intake manifold according to claim 1, wherein the first member and the second member are joined with each other by vibration welding.

4. The intake manifold according to claim 1, wherein the first member and the second member are joined with each other by ultrasonic welding.

5. The intake manifold according to claim 2, further comprising a lid portion arranged at the clearance, the lid portion decreasing a dimension of the clearance.

6. The intake manifold according to claim 5, wherein the lid portion includes a first lid portion provided at the first member passage wall portion, and a second lid portion provided at the second member passage wall portion and arranged so as to be opposed to the first lid portion.

7. The intake manifold according to claim 1, further comprising a blown-back inhibition portion provided from the surge tank to the passage wall portion, the blown-back inhibition portion being formed in a rib shape extending in a direction which is orthogonal to the passage wall portion, the blown-back inhibition portion inhibiting the external gas from blowing back to the upstream of the surge tank by being exposed to the external gas introduced to an inner space of the surge tank via the gas passage.

8. The intake manifold according to claim 2, further comprising a blown-back inhibition portion provided from the surge tank to the passage wall portion, the blown-back inhibition portion being formed in a rib shape extending in a direction which is orthogonal to the passage wall portion, the blown-back inhibition portion inhibiting the external gas from blowing back to the upstream of the surge tank by being exposed to the external gas introduced to an inner space of the surge tank via the gas passage.

9. The intake manifold according to claim 1, further comprising a gas passage outlet provided between the inner surfaces of the first member and the second member and an end portion of the passage wall portion which is arranged opposite to the division point, the gas passage outlet being communicated with an inner space of the surge tank and introducing the external gas to the inner space of the surge tank via the gas passage.

* * * * *